United States Patent Office 3,647,727
Patented Mar. 7, 1972

---

3,647,727
METHOD FOR RENDERING A SYNTHETIC RESINOUS MATERIAL ANTISTATIC
Kimiaki Kabuki, Tokyo, and Bunjiro Murai, Yokohama-shi, Japan, assignors to Tokyo Shibaura Electric Co., Ltd., Kawasaki-shi, Japan
No Drawing. Filed Feb. 17, 1969, Ser. No. 800,003
Claims priority, application Japan, Feb. 24, 1968, 43/11,388
Int. Cl. C08g 31/18
U.S. Cl. 260—18                                    4 Claims

ABSTRACT OF THE DISCLOSURE

An antistaticizing composition comprising (a) a polyhydric alcohol containing hydroxyl groups or a derivative thereof, (b) an organosilicon compound, and (c) an organometallic compound having one or more organic radicals bonded through an oxygen atom to a tin, boron, lead, phosphorus or antimony atom. From said composition, an antistatic agent, i.e., an organosilicon compound containing a polyoxyalkylene group bonded to a silicon atom through an oxygen atom, is formed upon heating in the process of conventional plastic molding operation.

---

The present invention relates to antistaticizing compositions for manufacturing moldings of synthetic resin possessed of a good antistatic nature, and more particularly to a process for rendering said moldings antistatic without reducing their transparency and heat resistance.

Accumulation of electrostatic charges in plastics is known to cause many problems. To prevent said electrostatic charges, therefore, there have heretofore been proposed various methods, for example, a molding process which is carried out by adding to high molecular weight materials surfactants such as amines or quarternary ammonium salts or moisture absorbing substances such as derivatives of alkylene oxide. Another consists in coating the surface of plastic moldings with the aforementioned surfactants or moisture absorbing substances. However, these conventional methods are known to tend to cause the antistatic effect of the resultant moldings to be prominently reduced when washed with, for example, suds. Particularly where the surface of plastic moldings was coated with an antistatic agent such as a surfactant, the antistatic effect was readily lost due to its limited capacity of adhesion when the moldings were rubbed or washed or during a long period in which they were used. Moreover, the prior art antistatic agent such as a surfactant generally had the drawbacks that it tended to be decomposed due to its low thermal stability when heated in the mixing or molding operation to decrease its antistatic effect or degrade the properties of plastic moldings themselves.

The present invention has been accomplished with the view of eliminating the aforementioned shortcomings so as to provide antistatic plastic moldings which possess semipermanent antistaticity and are free from loss of transparency or occurrence of turbidity. The antistatic process for high molecular weight materials according to the present invention resides in adding to high molecular weight polymers or monomers of plastic materials 0.5 to 50 percent by weight of compositions consisting of polyhydric alcohols having hydroxy groups or derivatives thereof, organosilicon compounds and organometallic compounds formed of organic groups bonded through a medium of oxygen with an atom selected from the group of tin, boron, lead, phosphorus and antimony, and generating from said compositions organosilicon compounds containing a polyoxyalkylene group bonded with a silicon atom through a medium of oxygen while said composition is heated in molding or other process operations, thereby rendering the resultant product semipermanently antistatic.

One of the main components of antistatic compositions of the present invention, namely, polyhydric alcohols having hydroxy groups or derivatives thereof include, for example polyoxyalkylene glycols including, polyethylene glycol, polypropylene glycol, ethers of polyoxyalkylene glycols including methoxypolyethylene glycol, ethers formed of groups such as lauryl, oleyl, nonylphenyl, alkyl phenyl or trimethyl nonyl bonded with polyethylene glycol or other glycols listed above, esters of polyethylene glycol laurate, sorbitan ethers containing polyethylene glycol esters, polyethylene glycol chloride sodium salts of polyethylene glycol, and glycerine derivatives. Most preferable among these polyhydric alcohols or derivatives thereof are polyoxyalkylene glycol, alkyl ethers of polyoxyalkylene glycol and aralkyl ethers of polyoxyalkylene glycol. With respect to the polyoxyalkylene glycol, the one having five or more carbon atoms has an excellent antistatic effect, and the ethylene type tends to display a higher antistaticity than the propylene type.

The other main component of antistatic compositions of the present invention, namely, organosilicon compounds such as ethyl silicate, partial hydrolysis products thereof, polyalkylhydrogenpolysilane, polyalkylalkoxypolysiloxy-polysiloxane, tetraalkyloxydimethyldisilane, derivatives thereof, tetraalkoxydimethyldisilmethylene, methyltrimethyoxysilane, dimethyltetraethoxydisilane, dimethyltetraethoxydisilmethylene, and polymethylhydrogenpolysiloxane, or organochlorosilane, organodisilane, organosiloxanesilomethylene, organosilethylene, organosilphenylene, halides of said organosilicon compounds, alkoxides and hydroxides of said organosilicon compounds. The proportions of said polyhydric alcohols or derivatives thereof and said organosilicon compounds are not subject to any particular limitation. However, generally preferable is the 80 to 20 percent by weight of the organosilicon compounds and consequently the 20 to 80 percent by weight of the polyhydric compounds.

The remaining component of antistatic compositions of the present invention, namely, organometallic compounds formed of organic groups bonded with, for example, a tin atom through a medium of oxygen acts as a catalyst for promoting reaction between the polyhydric alcohols or derivatives thereof and organosilicon compounds and is preferably added in amounts equal to 0.05 to 10.0 percent by weight on the basis of the total weight of these two reactants. The organometalic compounds concretely include, for example, compounds such as dibutyl tin dilaurate, dioctyl tin dilaurate, dibutyl tin distearate, dibutyl tin maleate, dioctyl tin fumarate, dibutyl tin dinonylate, tribenzyl tin laurate, or tribenzyl tin stearate expressed by the general formula:

$$(R_a)_x Sn(OOCR_b)_{4-x}$$

compounds of $(H_9C_4)_2Sn$
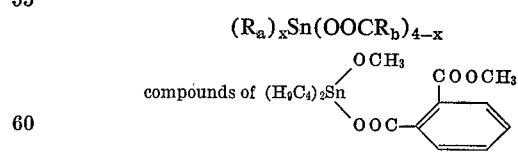

or

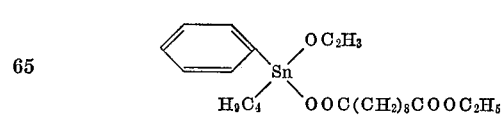

expressed by the general formula:

compounds of

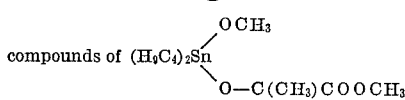

or

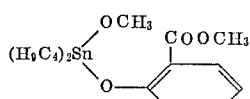

expressed by the general formula:

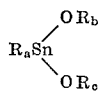

compounds of 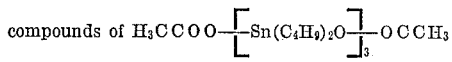

or

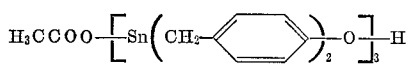

expressed by the general formula:

$R_bCOO[Sn(R_a)_2O]_mOCR_c$ or $R_bCOO[Sn(R_a)_2O]_mH$ compounds of $(CH_3SnOH)$, $(H_5C_6)_3SnOH$ or

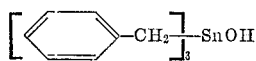

expressed by the general formula:

$(R_a)_3SnOH$ compounds of $H_3CO-Sn(C_4H_9)_2OOC-CH=CH-$
$COO(C_4H_9)_2Sn-OCH_3$ or

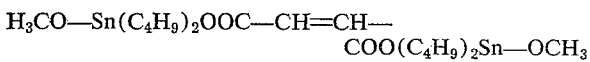

expressed by the general formula:

$R_bOSn(R_a)OOCR_cCOOSn(R_a)_2OR_b$ compound of $(H_9C_4)_2Sn[OC(CH_3)COOCH_3]_3$

expressed by the general formula:

$(R_a)_xSn(OR_b)_{4-x}$ and compounds expressed by the general formula:

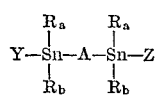

(Where $R_a$, $R_b$ and $R_c$ denote alkyl, allyl, allylalkyl, phenyl, xylyl, tolyl, naphthyl, benzyl, cyclohexyl, aralkyl, cycloalkyl, hydroxyalkyl, alkoxyalkyl, and furfuryl, Y and Z represent carboxylic groups, A indicates an oxygen or sulfur atom, $x$ shows an integer of 0 to 3 and $m$ an integer of 2 and over), and additionally boric and phosphoric esters of aliphatic acids such as sorbitan monolaurate, organolead salts of alpha and beta olefine carboxylic acids, such as triethyl lead hexyl maleate $(C_2H_5)_3Pb \cdot OOCCH=CHCOOC_8H_{17}$ and organo-antimony compounds of the $(R_a)_3SbY_2$ type such as $(C_6H_5)_3Sb(OCH_2 \cdot C_6H_5)_2$. For the purpose of the present invention, the organometallic compounds may consist of one or more of the above-listed compounds.

The antistatic compositions of the present invention consisting of the aforementioned two main components and catalysts are added at the rate of 0.5 to 50 percent by weight of monomers such as styrene, methyl methacrylate or methacrylic acid and thermoplastic and thermosetting synthetic resins including polystyrene resin, acrylic ester resin, epoxy resin, phenolic resin, alkyd resin, polysulfide, epoxy resin, acrylonitrile butadiene-styrene copolymers, polyester resin polypropylene, polyethylene or polyvinyl chloride. The mass may be formed by any ordinary molding method into antistatic plastic moldings which are possessed of a semipermanent antistaticity and free from loss of transparency or turbidity. The antistatic compositions of the present invention are also applicable as coatings on the surface of plastic moldings.

These antistatic compositions may be incorporated in plastic materials along with small amounts of adsorbents such as aluminosilicate, alumina, or silica gel. It is, of course, possible to use jointly with said compositions many other additives such as stabilizers, self-extinguishing agents, pigments, dyestuffs, lubricants, or plasticizers. It will be noted, however, that the content of said antistatic compositions proper falling below 0.5 percent by weight will have no effect, while their proportions in excess of 50 percent by weight will undesirably degrade the original properties of the base materials or high molecular weight materials.

The main components of antistatic compositions of the present invention added to high molecular weight polymers or monomers of plastic materials, namely, polyhydric alcohols or derivatives thereof and organosilicon compounds have good compatibility with said polymers or monomers and are easily dispersed therein due to their relatively small molecular weights and good dispersibility. Accordingly, when polymers mixed with these antistatic compositions are cast or press molded, or when polymers whose surface is coated with said compositions are heated, the polyhydric alcohols or derivatives thereof and organosilicon compounds readily react with each other by the catalytic action of the organometallic compounds to produce such type of organosilicon compounds as containing a polyoxyalkylene group bonded with a silicon atom through a medium of oxygen. This prevents the resultant product from losing transparency or being contaminated by turbidity.

The organosilicon compounds containing a polyoxyalkylene group bonded with a silicon atom through a medium of oxygen have excellent antistaticity and heat resistance due to the action of the polyoxyalkylene group and are not likely to be decomposed by the heat used in molding or other processing operations. Further, said organosilicon compounds acting as an antistatic agent slightly tend to be segregated on the surface of plastic materials due to their favorably low compatibility therewith and are sometimes partly removed when the plastic materials are washed with water or the like. Even then, however, suitable amounts of said organosilicon compounds bleed to the surface from the interior of the plastic materials to compensate for said loss, thereby rendering them semipermanently antistatic. In this connection it may be contemplated initially to incorporate said organosilicon compounds containing the polyoxyalkylene group bonded with a silicon atom through a medium of oxygen in high molecular weight polymers. Since, however, said organosilicon compounds acting as an antistatic agent have relatively low compatibility with high molecular polymers or monomers of plastic materials and a relatively large molecular weight, the compounds cannot be fully dispersed in said polymers or monomers, thus undesirably causing the resultant product to lose transparency or be contaminated by turbidity.

The present invention will be more fully appreciated by reference to the examples which follow. It will be understood, however, that they are offered only by way of illustration and are not intended to restrict the scope and breadth of the invention or limit the scope of the patent claims appended hereto. Throughout the examples, parts are by weight.

EXAMPLE 1

There was prepared an antistatic composition by thoroughly mixing 5 parts of a product obtained by partial hydrolysis of ethyl silicate (containing 45 percent of a free ethoxy group), 5 parts of hepta ethylene glycol monolauryl ether and 0.03 part of dibutyl tin maleate. 2 percent by weight of the composition thus prepared was added to polyethylene and the mass was extrusion molded into films 0.2 mm. thick by heating to a temperature of about 210° C. These films were rubbed 20 times with a sheet of gauze loaded with a weight of 1 kg. at the rate of 1 second each time. The voltage of electrostatic charges which were supposed to be excited by such rubbing was measured at zero volt. The films were also fully washed with an aqueous solution of soapless soap and allowed to stand 48 hours in an atmosphere at a temperature of 23° C. and relative humidity of 58%. Then the voltage of electrostatic charges accumulated in said films by rubbing performed in the same manner as described above was measured at 12 volts, but one second later fell to zero volt.

EXAMPLE 2

There was prepared an antistatic composition by thoroughly mixing 13 parts of tetraethoxy dimethyl disilane, 13 parts of polyethylene glycol having an average molecular weight of 600 and 0.5 part of dibutyl tin dioctoate. 1 percent by weight of the composition thus prepared was added to polystyrene resin, acrylonitrile-styrene resin and acrylonitrile-butadiene-styrene copolymers respectively. The masses were molded into a circular plate 2 mm. thick at a temperature of 220 to 260° C. The circular plates were subjected to discharges at ±4000 volts so as to cause electrostatic charges to be accumulated therein. The saturated voltage was measured at least than 50 volts, proving that each plate displayed an excellent antistatic effect.

Replacement of the tetraethoxy dimethyl disilane by tetraethoxy dimethyl silmethylene, or tetraethoxy dimethyl silphenylene or replacement of the polyethylene glycol by other types thereof having an average molecular weight of 400 and 1000 or polypropylene glycol gave the similar results.

EXAMPLE 3

Into a reaction vessel were introduced 1000 parts of polyethylene glycol having an average molecular weight of 600, 800 parts of a product obtained by partial hydrolysis of ethyl silicate and 7 parts of dibutyl tin laurate. The mass was stirred 1 hour in an atmosphere of nitrogen gas at a temperature of 28 to 32° C. to prepare an antistatic composition. Then were charged into the reaction vessel 40,000 parts of methyl methacrylate and 200 parts of benzoyl peroxide. The mass was heated with stirring 1 to 2 hours at a temperature of 58 to 62° C., obtaining semipolymerized methyl methacrylate containing said antistatic composition. The semipolymerized methyl methacrylate was poured between two superposed glass plates with a spacer lying therebetween and allowed to stand 24 hours at a temperature of 45° C., obtaining a clear plate of acrylic resin. When measurement was made after rubbing was conducted in the same manner as in Example 1, the voltage of electrostatic charges accumulated in said acrylic plate by said rubbing indicated zero. Also after the plate was washed with an aqueous solution of soapless soap, the electrostatic voltage was measured at −20 volts, but instantly attenuated.

EXAMPLE 4

There was prepared an antistatic composition by thoroughly mixing 13 parts of diphenyl dihydroxysilane, 28 parts of polyethylene glycol monomethoxy ether having an average molecular weight of 450 and 0.7 part of a compound expressed by a chemical formula:

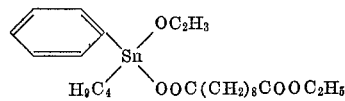

The composition thus prepared was mixed with 1000 part of polyester resin. The mass was spun into polyester yarns to make woven fabric. A 50 cm. square sheet cut out of said fabric was strongly rubbed with a cotton cloth and immediately afterward was brought near to fresh tobacco ashes, but did not attract them, showing that the fabric had excellent antisaticity. The fabric was also washed with thorough rubbing using a detergent. After the fabric was dried, the accumulation therein of electrostatic charges due to friction was examined. But there was observed no such accumulation. The aforementioned cycle of a test was repeated many times, and it was only in the seventeenth cycle that the test fabric slightly attracted fresh tobacco ashes (when it was brought to a point 1 mm. from the ashes).

EXAMPLE 5

There was prepared an antistatic composition by thoroughly mixing 4.5 parts of polyethylene glycol having an average molecular weight of 600, 2.8 parts of polymethylhydrogenopolysiloxane, 0.75 part of triethyl lead hexylmaleate and 1 part of aluminosilicate.

The composition thus prepared was thoroughly blended with another composition comprising 100 parts of epoxy resin and 8.5 parts of triethylene tetramine. The mass was placed in an organic glass tube 25 mm. in inner diameter and allowed to stand about 30 minutes at a temperature of 40° C. A rod taken out of the glass tube after solidification was rubber 20 times on the surface with a sheet of gauze loaded with a weight of 1 kg. When the rubbed surface was drawn to fresh tobacco ashes, it did not attract them, proving that the rod had an excellent antistatic effect. The test piece was also washed with a neutral detergent and allowed to stand 100 hours at room temperature. It was examined by bringing the rod close to fresh tobacco ashes whether rubbing conducted in the same manner as described above could cause electrostatic charges to be accumulated therein. But the rod did not attract the tobacco ashes at all.

What we claim is:

1. A method of rendering a synthetic resinous material antistatic which comprises incorporating into said material 0.5 to 50% by weight based on the resinous material of a mixture consisting of:
   (a) 20 to 80% by weight of a component selected from the group consisting of polyoxyalkylene glycol, alkyl ether of polyoxyalkylene glycol and aralkyl ether of polyoxyalkylene glycol,
   (b) 20 to 80% by weight of a component selected from the group consisting of organosilane, organohalosilane, organodisilane, organohalodisilane, organopolysilane, organohalopolysilane, organopolysiloxane, organohalopolysiloxane, organosilylalkylene, organohalosilylalkylene, organosilylarylene and organohalosilylarylene, and
   (c) 0.05 to 10% by weight of a catalyst component selected from the group consisting of the formulae:

$$(R_a)_x Sn(OOCR_b)_{4-x}$$

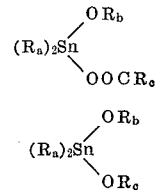

$R_bCOO[Sn(R_a)_2O]_mOCR_c$
$R_bCOO[Sn(R_a)_2O]_mH$
$(R_a)_3SnOH$
$R_bOSn(R_a)OCCR_bCOOSn(R_a)_2OR_b$
$(R_a)_xSn(OR_b)_{4-x}$ and

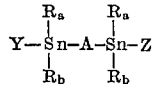

where $R_a$, $R_b$ and $R_c$ denote alkyl, allyl, allylalkyl, phenyl, xylyl, tolyl, naphthyl, benzyl, cyclohexyl, aralkyl, cycloalkyl, hydroxyalkyl, alkoxyalkyl, and furfuryl, Y and Z represent carboxylic groups, A indicates an oxygen or sulfur atom, $x$ shows an integer of 0 to 3 and $m$ an integer of 2 and over, and forming an organosilicone reaction product of said components containing a polyoxyalkylene group bonded to a silicon atom through an oxygen atom in situ in said resinous material by subjecting the components to the action of heat of more than 40° C. during the course of a conventional molding operation performed upon said resinous material containing said mixture.

2. A method as claimed in claim 1 wherein said component (a) has an average molecular weight between about 240 to 600.

3. The method of claim 1 in which said polyoxyalkylene glycol contains at least 5 carbon atoms.

4. The method of claim 3 wherein said polyoxalkylene glycol is polyethylene glycol.

References Cited
UNITED STATES PATENTS

| | | | |
|---|---|---|---|
| 3,061,558 | 10/1962 | Alter | 260—2.5 |
| 3,271,331 | 9/1966 | Ender | 260—2.5 |
| 3,389,094 | 6/1968 | D'Alessandro | 260—2.5 |
| 3,422,038 | 1/1969 | Meyer et al. | 260—2.5 |
| 3,480,583 | 11/1969 | Bailey et al. | 260—46.5 |
| 3,484,391 | 12/1969 | Wheatley et al. | 260—2.5 |
| 3,499,811 | 3/1970 | Clarke | 260—2.5 |
| 3,299,066 | 1/1967 | Tomiyama et al. | 260—75 |
| 3,397,158 | 8/1968 | Britain et al. | 260—18 N |

DONALD E. CZAJA, Primary Examiner

E. C. RZUCIDLO, Assistant Examiner

U.S. Cl. X.R.

260—2 EP, 47 R, 51 R, 75 S, 8 B, 79, 80.7 5.5 S